(12) United States Patent
Malloy et al.

(10) Patent No.: US 11,384,457 B2
(45) Date of Patent: Jul. 12, 2022

(54) WOVEN TUBULAR THERMAL SLEEVE AND METHOD OF CONSTRUCTION THEREOF

(71) Applicant: FEDERAL-MOGUL POWERTRAIN LLC, Southfield, MI (US)

(72) Inventors: Cassie M. Malloy, Trappe, PA (US); Qingtong Ge, Exton, PA (US); Tianqi Gao, Exton, PA (US); Edgar Muele, El Paso, TX (US); Danny Winters, Downingtown, PA (US)

(73) Assignee: Federal-Mogul Powertrain LLC, Southfield, MI (US)

(*) Notice: Subject to any disclaimer, the term of this patent is extended or adjusted under 35 U.S.C. 154(b) by 532 days.

(21) Appl. No.: 16/519,376

(22) Filed: Jul. 23, 2019

(65) Prior Publication Data
US 2019/0375181 A1    Dec. 12, 2019

Related U.S. Application Data

(62) Division of application No. 15/227,480, filed on Aug. 3, 2016, now Pat. No. 10,357,933.

(Continued)

(51) Int. Cl.
*D03D 1/00* (2006.01)
*D03D 3/02* (2006.01)
(Continued)

(52) U.S. Cl.
CPC ............. *D03D 1/0043* (2021.05); *B32B 1/08* (2013.01); *B32B 5/024* (2013.01); *B32B 15/14* (2013.01);
(Continued)

(58) Field of Classification Search
CPC ...... D03D 3/02; D03D 1/0035; D03D 25/005; D01B 2101/06; D01B 2331/04;
(Continued)

(56) References Cited

U.S. PATENT DOCUMENTS

| 6,003,565 A | 12/1999 | Whittier, II et al. |
| 6,340,510 B2 | 1/2002 | Hess et al. |

(Continued)

FOREIGN PATENT DOCUMENTS

| JP | 2001504553 A | 4/2001 |
| JP | 2003201640 A | 7/2003 |

OTHER PUBLICATIONS

Wei Pu, "Clothing Textiles and Accessories", China Textile Press, 2nd edition, Feb. 2015, p. 153.

*Primary Examiner* — Camie S Thompson
(74) *Attorney, Agent, or Firm* — Robert L. Stearns; Dickinson Wright, PLLC

(57) ABSTRACT

A thermal sleeve for routing and protecting elongate members and method of construction thereof are provided. The sleeve has a tubular woven wall extending along a central axis between opposite open ends with an outer reflective foil layer fixed thereto. The wall is woven with lengthwise extending warp yarns and circumferentially extending fill yarns. The fill yarns include first and second fill yarns bundled in side-by-side abutting relation as a single pick, thereby forming discrete single pick bundles in axially spaced relation from one another. The first fill yarn is provided as a standard monofilament, while the second fill yarn is provided having a low melt material melted and bonded to the abutting first fill yarn and to portions of the abutting warp yarns, wherein the spaces between the discrete bundles remain substantially free of melted material, thereby further enhancing longitudinal flexibility of the sleeve.

8 Claims, 2 Drawing Sheets

Related U.S. Application Data

(60) Provisional application No. 62/200,783, filed on Aug. 4, 2015.

(51) Int. Cl.
| | | |
|---|---|---|
| *H02G 3/04* | (2006.01) | |
| *B60R 16/02* | (2006.01) | |
| *D03D 15/47* | (2021.01) | |
| *D03D 15/267* | (2021.01) | |
| *B32B 1/08* | (2006.01) | |
| *B32B 5/02* | (2006.01) | |
| *B32B 15/14* | (2006.01) | |
| *D03D 25/00* | (2006.01) | |
| *F16L 57/06* | (2006.01) | |
| *H01B 7/17* | (2006.01) | |

(52) U.S. Cl.
CPC ............ *B60R 16/0207* (2013.01); *D03D 3/02* (2013.01); *D03D 15/267* (2021.01); *D03D 15/47* (2021.01); *D03D 25/005* (2013.01); *F16L 57/06* (2013.01); *H01B 7/17* (2013.01); *H02G 3/04* (2013.01); *H02G 3/0412* (2013.01); *H02G 3/0481* (2013.01); *B32B 2262/0284* (2013.01); *B32B 2262/101* (2013.01); *B32B 2307/304* (2013.01); *B32B 2605/00* (2013.01); *D10B 2101/06* (2013.01); *D10B 2331/04* (2013.01); *D10B 2401/041* (2013.01)

(58) Field of Classification Search
CPC ......... Y10T 428/1362; Y10T 428/1369; B32B 5/024; B32B 1/08; B32B 2262/101; B32B 2262/0284; B32B 2605/00; H01B 7/17; H02G 3/04; H02G 3/0412; H02G 3/0481; F16L 57/06; D10B 2401/041
USPC ................. 138/123; 428/36.1, 36.3; 156/148
See application file for complete search history.

(56) References Cited

U.S. PATENT DOCUMENTS

| | | |
|---|---|---|
| 2009/0218002 A1 | 9/2009 | Kashihara |
| 2010/0313989 A1 | 12/2010 | Kashihara |
| 2014/0220276 A1 | 8/2014 | Gao et al. |
| 2014/0272218 A1 | 9/2014 | Thomas et al. |
| 2015/0093556 A1 | 4/2015 | Woodruff et al. |

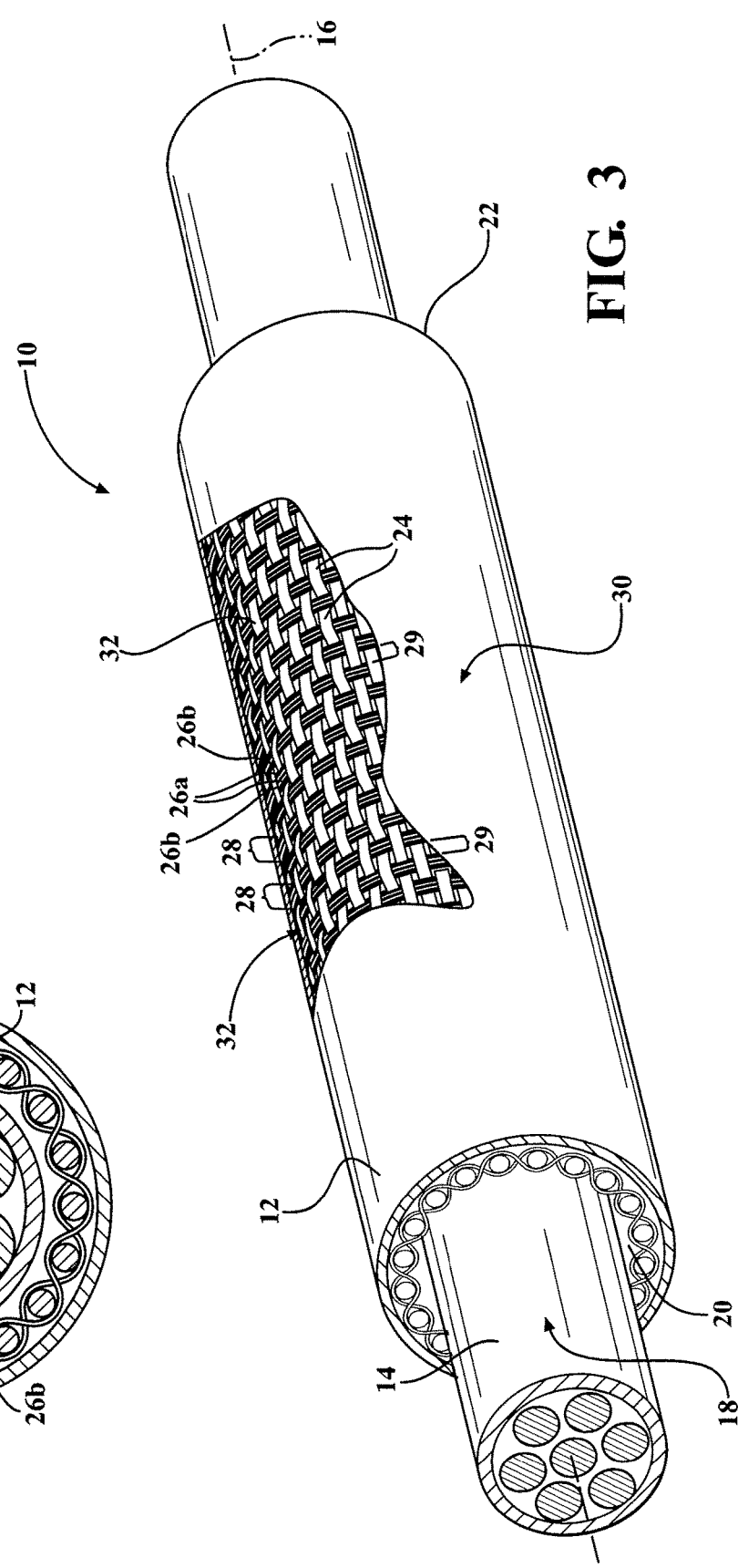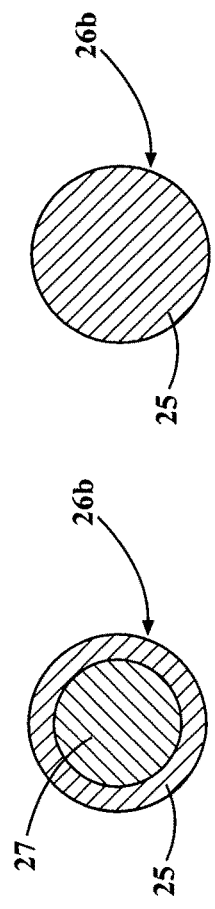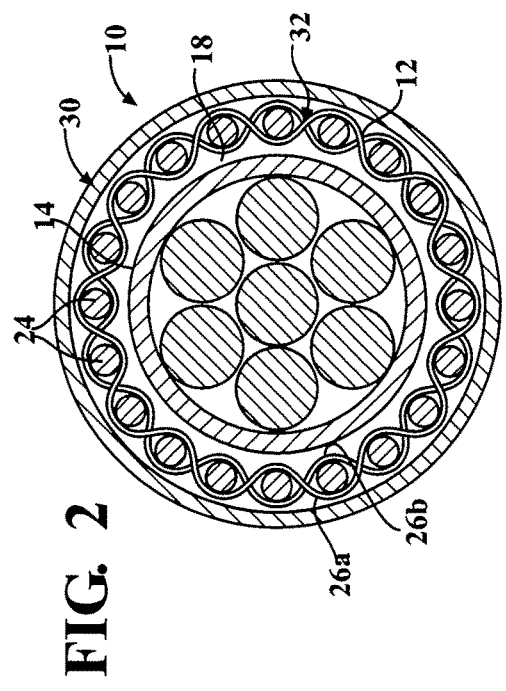

WOVEN TUBULAR THERMAL SLEEVE AND METHOD OF CONSTRUCTION THEREOF

CROSS-REFERENCE TO RELATED APPLICATION

This U.S. Divisional application claims the benefit of U.S. Utility application Ser. No. 15/227,480, filed Aug. 3, 2016 and U.S. Provisional Application Ser. No. 62/200,783, filed Aug. 4, 2015, both of which are incorporated herein by reference in their entirety.

BACKGROUND OF THE INVENTION

1. Technical Field

This invention relates generally to textile sleeves for protecting elongate members, and more particularly to thermally protective woven tubular sleeves.

2. Related Art

It is known to contain elongate members, such as wires, wire harnesses, cables and conduits of various types, in both tubular braided and woven textile sleeves having a reflective foil outer layer bonded thereto, such as in automobiles, aircraft and aerospace craft, to provide protection to the elongate members against abrasion, fluid and thermal affects. However, problems with the known protective sleeves have proven difficult to overcome; namely, the braided sleeves are typically loose and take on a flat profile, while the protective woven sleeves typically have a very tight weave structure to prevent the woven yarns from shifting relative to one another, and thus, the woven sleeves are generally very stiff. Both conditions present potential problems in use. With the braided sleeves, the sleeves are difficult to install as a result of being generally flat, and also have problems with the outer foil layer becoming cracked in shipment due to the relatively flimsy, flattened structure of the braided wall. Similarly, the woven sleeves can be difficult to install over meandering wires/conduit as a result of being so stiff and inflexible, which also can result in unwanted kinking of the sleeve when routed around corners. Both types of sleeves are further known to have problems with end fray, particularly upon being cold cut to length, which results when the yarns fall out the open ends of the sleeves.

Accordingly, what is needed is a sleeve that provides a balance between maintaining a round, tubular form to facilitate installation over elongate members and to prevent cracking of an outer foil layer, such as during shipment, while at the same time being flexible enough to allow the sleeve to be readily installed over meandering paths while also prevent kinking when routed about corners, and further, resists end fray upon being cold cut to length and while in use.

SUMMARY OF THE INVENTION

One aspect of the invention provides a thermal sleeve for routing and protecting elongate members. The sleeve has an elongate, tubular woven wall extending along a central axis between opposite open ends with an outer layer of reflective foil fixed thereto. The wall is woven with warp yarns extending parallel to the central axis and fill yarns extending transversely to the warp yarns. The fill yarns are provided as first fill yarn and second fill yarn, wherein the first fill yarn is bundled with the second fill yarn in side-by-side abutting relation. As such, the first fill yarn and second fill yarn are woven together as a single pick, thereby forming discrete single pick bundles extending circumferentially about the central axis, with the discrete bundles being spaced axially from one another along the length of the sleeve to enhance longitudinal flexibility of the sleeve. The first fill yarn is provided as a standard monofilament, such as of natural PET, while the second fill yarn is provided, at least in part, as a low melt yarn, with the second fill yarn being melted and bonded to the abutting first fill yarn and to portions of the abutting warp yarns, wherein the spaces between the discrete bundles remain substantially free of melted material, thereby further enhancing longitudinal flexibility of the sleeve.

In accordance with another aspect of the invention, the second fill yarn can be provided as a bicomponent monofilament having a heat-set core and an outer sheath melted and bonded with adjacent yarns.

In accordance with another aspect of the invention, the warp yarns can be provided as multifilaments.

In accordance with another aspect of the invention, the warp yarns can be provided as glass-fiber multifilaments.

In accordance with another aspect of the invention, the outer foil layer can be spiral wrapped about the woven wall.

In accordance with another aspect of the invention, the outer foil layer can be cigarette wrapped about the woven wall.

In accordance with yet another aspect of the invention, a method of constructing a thermal sleeve is provided. The method includes weaving an elongate tubular wall with warp yarns extending parallel to a central axis between opposite open ends of the wall and fill yarns extending transversely to the warp yarns. The method further includes providing the fill yarns including first fill yarn and second fill yarn bundled in side-by-side relation and weaving the bundled first and second yarns as a single pick, thereby forming discrete, single pick bundles of the first and second yarns extending circumferentially about the central axis, with the discrete bundles being spaced axially from one another along the length of the sleeve, wherein the spaces provide enhanced longitudinal flexibility to the sleeve. The method further includes providing the first fill as a standard monofilament, such as of natural PET, and providing the second fill yarn, at least in part, as a low melt yarn. Further yet, the method includes applying an outer layer of foil on an outer surface of the woven wall. The method further includes disposing the woven wall over a mandrel and heating the second fill yarn to cause at least a portion of the second fill yarn to melt and bond with the abutting first fill yarn and abutting portions of the warp yarn, thereby acting to lock the bonded yarns together, while leaving at least a portion of the spaces between the discrete bundles free of melted material, thereby further enhancing longitudinal flexibility of the sleeve.

In accordance with another aspect of the invention, the method can further include providing the second fill yarn as a bicomponent monofilament having a heat-settable core and an outer meltable sheath, and while heating the second yarn on the mandrel, causing the outer sheath to melt and bond with adjacent yarns and causing the inner cored to take-on a heat-set.

In accordance with another aspect of the invention, the method can further include providing the warp yarns as multifilaments.

In accordance with another aspect of the invention, the method can further include providing the warp yarns as glass-fiber multifilaments.

In accordance with another aspect of the invention, the method can further include spiral wrapping the foil layer about the woven wall.

In accordance with another aspect of the invention, the method can further include cigarette wrapping the foil layer about the woven wall.

In accordance with another aspect of the invention, the method further includes weaving the fill yarns having a picks per inch greater than 6.

In accordance with another aspect of the invention, the method includes weaving the fill yarns having a picks per inch between about 6 and 14.

In accordance with another aspect of the invention, the method can further include weaving 2 passes of the first fill yarn and 2 passes of the second fill yarn in each pick.

In accordance with another aspect of the invention, the method can further include weaving the tubular wall on a flatbed needle loom.

In accordance with another aspect of the invention, the method can further include weaving the tubular wall on a shuttle loom.

BRIEF DESCRIPTION OF THE DRAWINGS

These and other aspects, features and advantages will become readily apparent to those skilled in the art in view of the following detailed description of presently preferred embodiments and best mode, appended claims, and accompanying drawings, in which:

FIG. 2 is a schematic cross-sectional view taken generally along the line 2-2 of FIGS. 1 and 1A;

FIG. 3 is an enlarged partially broken away view of an outer reflective layer of a tubular wall of the sleeves of FIGS. 1 and 1A;

FIG. 4A is an enlarged cross-sectional view of a weft yarn in accordance with one aspect of the invention; and FIG. 4B is an enlarged cross-sectional view of a weft yarn in accordance with another aspect of the invention.

DETAILED DESCRIPTION OF PREFERRED EMBODIMENTS

Figure 1:
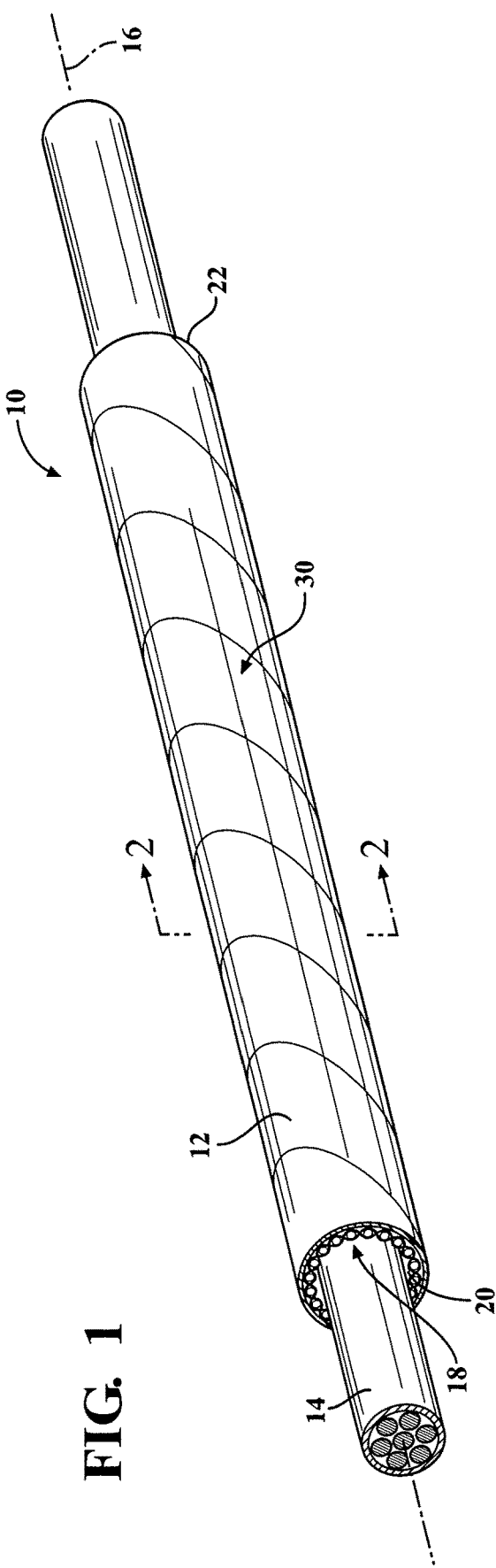
FIG. 1 is a schematic perspective view of a tubular, woven sleeve constructed in accordance with one aspect of the invention.

Referring in more detail to the drawings, FIG. 1 shows a schematic representation of a thermally protective tubular woven sleeve, referred to hereafter as sleeve 10, constructed in accordance with one aspect of the invention. It is to be understood that by tubular, it is meant that the sleeve 10 has a circumferentially continuous wall 12, and that it does not have free lengthwise extending side edges. The sleeve 10 is intended for routing and protecting elongate members 14, such as wires, a wire harness, or conduit, for example, from exposure to abrasion and the ingress of contamination, debris and the like, while also shielding the elongate members 14 against exposure to heat. The elongate wall 12 extends lengthwise along a central axis 16 and bounds a circumferentially enclosed cavity 18 that extends along the central axis 16 between opposite open ends 20, 22. The wall 12 is woven with warp yarns 24 and fill yarns, wherein the fill yarns include first fill yarn 26a and second fill yarn 26b. The first fill yarn 26a is bundled with the second fill yarn 26b in side-by-side, abutting relation. As such, the first fill yarn 26a and second fill yarn 26b are woven together as a single pick of yarn in side-by-side relation, thereby forming discrete bundles 28 extending circumferentially about the central axis 16, with the discrete bundles 28 being spaced axially from one another by discrete fill yarn free spaces 29 along the length of the sleeve 10. The spaces 29 have an axially extending width extending between adjacent bundles 28 approximately equal to the width of the individual bundles 28. The fill yarn free spaces 29 function to provide enhanced longitudinal flexibility to the sleeve 10, for reasons discussed in more detail below. It should be recognized that the width of the individual spaces 29 can be altered as necessary to selectively increase or decrease the longitudinal flexibility of the sleeve 10 by adjusting the picks-per-inch, as desired for the intended application. The picks-per-inch can be adjusted over the length of the sleeve 10, such that the sleeve 10 can possess select regions of increased flexibility as a result of a decreased number of picks-per-inch and regions of increased stiffness as a result of increased number of picks-per-inch.

The first fill yarn 26a is provided as a standard monofilament, such as of natural PET, while the second fill yarn 26b is provided as a low melt yarn formed, at least in part, of a low melt material 25 extending along the entire length of the outer surface of the second fill yarn 26b. With the low melt material 25 of the second fill yarn 26b being melted during construction of the sleeve 10, the second fill yarn 26b is caused to bond with the abutting first fill yarn 26a and abutting portions of the warp yarns 24. To enhance the flexibility of the sleeve 10, at least a portion of the discrete spaces 29 remain free of the melted material of the second fill yarn 26b. It should be recognized that the melted material of the second fill yarn 26b solidifies upon being melted, whereupon the solidified material possesses an increased stiffness. Accordingly, the spaces 29, being free of the solidified material, provide enhanced longitudinal flexibility to the sleeve 10.

To protect and shield the elongate members 14 from exposure to external heat and against the ingress of contaminants, a reflective outer layer 30 is fixed, such as being bonded via a suitable high temperature adhesive, to an outer surface 32 of the woven wall 12.

The wall 12 is constructed to maintain a generally round shape, thereby avoiding flattening under its own weight and resists end-fray, which is an undesirable condition resulting from fill yarns falling out the ends 20, 22 of the sleeve, via melted and bonded portions of the second fill yarn 26b. To further enhance the ability of the wall 12 to maintain its round shape, the second fill yarn 26b, in addition to having its outer surface at least partially melted, can also be provided to be heat-set. Accordingly, in accordance with a presently preferred embodiment, the second fill yarn 26b is provided as both a heat-settable yarn and as a low melt yarn, such as, by way of example and without limitation, as shown in FIG. 4A, a dual functioning bicomponent yarn. The bicomponent weft yarn 26b includes a central core 27 and an outer sheath 25, wherein the outer sheath 25 is a low melt material having a lower melt temperature than the central core 27 to facilitate melting and bonding the outer sheath with adjacent, abutting yarns, thereby acting to lock the abutting fill and warp yarns in place with one another and preventing end fray upon cold cutting the sleeve wall 12 to length. The central core 27 is provided as a heat-settable material to maintain the yarns 26b, and thus the wall 12, in a generally round configuration, as viewed in lateral cross-section taken generally transversely to the central axis 16. Although bicomponent yarn 26b is preferred for the second fill yarn 26b, other types of yarn are considered herein, such as heat, water, or pressure activated material that melts, bonds, or activates under certain conditions to secure the yarns in the woven structure to one another. The material of the second fill yarn 26b can also include adhesive coated yarns or strips of material, entanglement, twisting, or incorporating materials of different melting temperatures and/or activation properties into one yarn, whether monofilament or multifilament. Further yet, as shown in FIG. 4B, it is contemplated that the second fill yarn 26b can be provided as a monofilament of low melt material 25 having a melt temperature less than the melt temperature of the first fill yarns 26a. In addition, to provide abrasion resistance and additional hoop strength, the first fill yarn 26a can be provided as a natural PET monofilament, by way of example and without limitation.

In one exemplary embodiment, both the fill yarns 26a, 26b were provided as 0.38 mm monofilaments, and were woven with the warp yarns 24 in a plain weave pattern of 9 picks-per-inch (PPI), with each bundle 28 extending over and under every other alternating warp yarn 24, and with each warp yarn 24 extending over and under every other alternating bundle 28. The warp yarns 24 were provided as glass-fiber multifilaments having a denier of 3822 and a warp density of 21 ends, by way of example and without limitation. It should be recognized that other types of warp yarn are contemplated herein, such as multifilaments of standard or natural PET, by way of example and without limitation. It should also be recognized that other types of weave patterns are contemplated herein, such as a basket and twill weave patterns, for example, and further, the diameter of the fill yarns can be any suitable diameter.

Figure 1A:
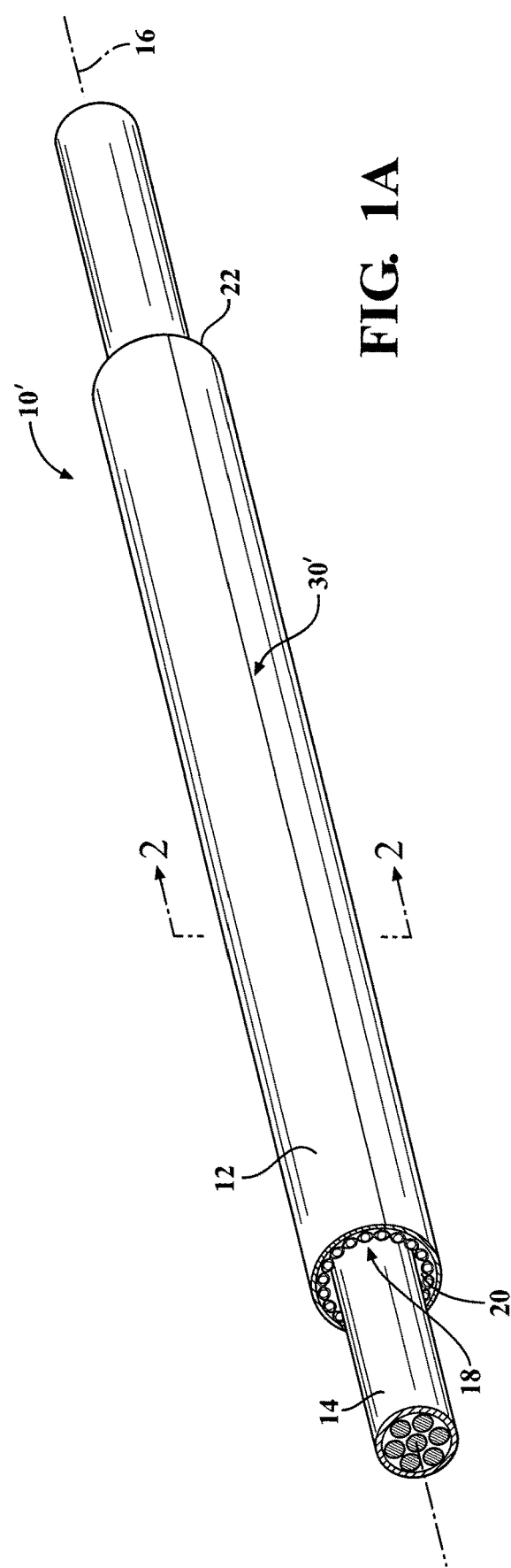
FIG. 1A is a view similar to FIG. 1 of a tubular, woven sleeve constructed in accordance with one aspect of the invention.

Upon weaving the circumferentially continuous wall 12, the reflective outer layer 30 can be fixed or bonded to the outer surface 32 of the wall 12. The reflective outer layer 30 can be any suitable wrappable metal foil, such as aluminum, for example, wherein the layer 30 can have any desired thickness suitable to provide the desired durability and flexibility. As shown in FIG. 1, the reflective outer layer 30 can be provides as a generally narrow strip of material that is helically wrapped about the outer surface 32 of the wall 12 of the sleeve 10, or as shown in FIG. 1A, the outer layer 30' can be provided having a width slight greater than the outer circumference of the wall 12, such that it can be wrapped in "cigarette" fashion about the outer surface 32 of the wall 12 of the sleeve 10' to bring opposite, lengthwise extending edges into overlapping relation with one another. Regardless of which wrapping construction is used, a suitable adhesive can be used to bond overlapping edges of the respective reflective layer 30, 30' to themselves and/or to bond the reflective outer layer 30, 30' directly to the outer surface 32 of the wall 12.

In accordance with another aspect of the invention, a method of constructing a thermally protective tubular sleeve 10 is provided. The method includes weaving an elongate tubular wall 12 with warp yarns 24 extending parallel or substantially parallel to a central axis 16 between opposite open ends 20, 22 of the wall 12 and fill yarns extending transversely or substantially transversely to the warp yarns 24. The method further includes providing the fill yarns including first fill yarn 26a and second fill yarn 26b bundled in side-by-side relation with one another and weaving the bundled first and second fill yarns 26a, 26b as a single pick, thereby forming discrete bundles 28 of the first and second yarns 26a, 26b extending circumferentially about the central axis 16, with the discrete, single pick bundles 28 being spaced axially from one another along the length of the sleeve 10 by discrete spaces 29, which function to providing the sleeve 10 with enhanced longitudinal flexibility. The method further includes providing the first fill 26a as a standard monofilament, such as of natural PET, and providing the second fill yarn 26b, at least in part, as a low melt yarn material 25. Further yet, the method includes wrapping an outer layer of foil 30 about an outer surface 32 of the woven wall 12. The method further includes disposing the woven wall 12 over a mandrel and heating the second fill yarn 26b to cause at least a portion of the fill yarn 26b to melt, solidify and bond with the abutting first yarn 26a and abutting portions of the warp yarns 24, thereby acting to lock the bonded yarns together, while at the same time, leaving at least a portion of the spaces 29 free of melted material, thereby retaining enhanced longitudinal flexibility of the sleeve 10 via the spaces 29.

In accordance with another aspect of the invention, the method can further providing the second fill yarn 26b as a bicomponent monofilament having a heat-settable core 27 and an outer meltable outer sheath 25, and while heating the second yarn 26b on the mandrel, causing the outer sheath 25 to melt and bond with adjacent yarns 24, 26a and causing the inner core 27 to take-on a heat-set shape, thereby providing enhanced hoop strength to the sleeve 10 and acting to maintain the sleeve 10 having a generally round shape as viewed in lateral cross-section (FIG. 2).

In accordance with another aspect of the invention, the method can include providing the warp yarns 24 as multifilaments, such as glass-fiber multifilaments or PET multifilaments, for example.

In accordance with another aspect of the invention, the method can include wrapping the foil layer 30 about the woven wall in a cigarette wrapped fashion (FIG. 1A) or helically wrapped fashion (FIG. 1).

In accordance with another aspect of the invention, the method includes weaving the fill yarns having a picks-per-inch (PPI) greater than 6, and in one exemplary embodiment, having a PPI between about 6 and 14, such as 9, for example. It is to be recognized that the PPI could be formed deviating at least slightly beyond the aforementioned limits, though testing has shown optimal performance under the test conditions between 6 and 14 PPI.

In accordance with another aspect of the invention, to enhance the finished hoop strength of the sleeve 10, 10', the method can include weaving 2 passes of the first fill yarn 26a and 2 passes of the second fill yarn 26b in each pick, thereby forming each of the bundles 28 having 4 abutting yarn segments, with each bundle 28 being separated axially from one another by the intervening space 29.

In accordance with another aspect of the invention, the method can include weaving the tubular wall 12 on a flatbed needle loom or on a shuttle loom.

Obviously, many modifications and variations of the present invention are possible in light of the above teachings. It is, therefore, to be understood that within the scope of the appended claims, the invention may be practiced otherwise than as specifically described.

What is claimed is:

1. A method of constructing a textile sleeve, comprising:
weaving an elongate tubular wall with warp yarns extending parallel to a central axis between opposite open ends of the wall and fill yarns extending transversely to the warp yarns;
providing the fill yarns including first fill yarn having a first melt temperature and a second fill yarn including an outer surface of low melt material having a second melt temperature less than the first melt temperature and weaving the first and second fill yarn in side-by-side relation to form discrete bundles extending circumferentially about the central axis;

applying an outer layer of foil on an outer surface of the woven wall; and disposing the woven wall over a mandrel and heating the second fill yarn to cause the low melt outer surface of the second fill yarn to melt and bond with the abutting first fill yarn and abutting portions of the warp yarn to lock the bonded yarns together.

2. The method of claim 1, further including spacing the discrete bundles axially from one another by spaces free from said melted low melt material.

3. The method of claim 1, further including providing the second fill yarn as a bicomponent monofilament having a heat-settable core and heat setting the heat-settable core.

4. The method of claim 3, further including providing the first fill yarn as a non-heat-settable material.

5. The method of claim 3, further including providing the warp yarns as multifilaments.

6. The method of claim 1, further including weaving the wall having a plain weave pattern.

7. The method of claim 1, further including spiral wrapping the outer foil layer about the woven wall.

8. The method of claim 1, further including cigarette wrapping the outer foil layer about the woven wall.

* * * * *